Patented June 26, 1945

2,379,390

UNITED STATES PATENT OFFICE 2,379,390

MANUFACTURE OF ACYL PEROXIDES

Karl Heinrich Walter Tuerck, Banstead, England, assignor to The Distillers Company Limited, Edinburgh, Scotland, a British company No Drawing. Application March 17, 1943, Serial No. 479,475. In Great Britain January 8, 1942

5 Claims. (Cl. 260—610)

The usual method of preparing peroxides of organic acids by reacting acid chlorides with an alkali peroxide or hydrogen peroxide in an alkaline medium cannot be successfully used in the industrial manufacture of aliphatic acid peroxides. It has, therefore, been suggested to dissolve the acid anhydride, e. g., acetic anhydride or crotonic anhydride, in a solvent such as ether and to bring this ethereal solution into contact with a suspension of barium peroxide in water. Owing to the dangerous properties of acyl peroxides, however, a process which involves the use of a solvent is technically not desirable.

According to the present invention a process for the manufacture of crotonyl peroxide in high yield consists in reacting an aqueous emulsion or dispersion of crotonic anhydride with hydrogen peroxide, while neutralizing the evolved crotonic acid by adding gradually the necessary amount of alkali or other suitable neutralising agent, till the liquid-liquid emulsion or dispersion breaks and the solid crotonyl peroxide is precipitated.

This process proceeds so rapidly that efficient cooling is necessary to keep the reaction temperature within reasonable limits. We prefer to carry out the reaction at as low a temperature as possible, at about 0° C., but it is possible to prepare crotonyl peroxide at temperatures up to 10° C. or higher if one takes care not to allow the temperature to go out of control. The reaction proceeds in such a manner that two molecules of crotonic anhydride react with the hydrogen peroxide to yield one molecule of crotonyl peroxide and two molecules of crotonic acid.

The rate of reaction can be regulated by the gradual addition of alkali. Sodium hydroxide is preferably used for this purpose but other neutralising agents can be used. It is surprising that crotonic anhydride, which in this process is unprotected by any organic solvent, reacts preferentially with the hydrogen peroxide and does not undergo any substantial degree of saponification.

In addition to the high yield and the rapid reaction my process has the advantage of yielding products of small particle size which minimises the danger of explosions during filtering and during storage.

The following example illustrates one method of making crotonyl peroxide.

180 parts of crotonic anhydride are vigorously stirred with 300 parts of water and 60 parts of 30% hydrogen peroxide so that an emulsion or dispersion results. Thereafter a 20% solution of sodium hydroxide is slowly added either continuously or intermittently. The temperature is kept at 0° C. by cooling. After half an hour fine crystals separate out and as soon as the oil-drops in the emulsion or dispersion disappear the crystals are filtered off, washed with water and dried in the air. 95 grams (94% of the theoretical yield) of a white crystalline powder are obtained, the melting point of which is 40° to 41° C. The product is free from alkali, crotonic acid or hydroxy-compounds and is stable under normal conditions.

What I claim is:

1. A process for the manufacture of crotonyl peroxide by reacting crotonic anhydride, in intimate admixture with water, with hydrogen peroxide, while neutralizing the evolved crotonic acid by gradually adding the necessary amount of neutralizing agent until solid crotonyl peroxide is precipitated.

2. A process according to claim 1 wherein the intimate admixture is an aqueous emulsion, and the temperature of reaction is maintained between 0° and 10° C.

3. A process according to claim 1 wherein the intimate admixture is an aqueous dispersion, and the temperature of reaction is maintained between 0° and 10° C.

4. A process according to claim 1 wherein the neutralizing agent is in the form of a caustic alkaline solution.

5. A process according to claim 1 wherein the neutralizing agent is in the form of a caustic alkaline solution and the rate of reaction is regulated by the gradual addition of the latter.

KARL HEINRICH WALTER TUERCK.